United States Patent [19]

Janin

[11] 4,073,693

[45] Feb. 14, 1978

[54] APPARATUS AND METHOD FOR CONDUCTING A PLURALITY OF BIOLOGICAL TESTS

[75] Inventor: Pierre R. Janin, New York, N.Y.

[73] Assignee: American Home Products Corporation, New York, N.Y.

[21] Appl. No.: 693,902

[22] Filed: June 8, 1976

[51] Int. Cl.$^2$ .............................................. C12B 1/00

[52] U.S. Cl. ............................ 195/103.5 K; 195/127; 206/219; 206/221; 220/367; 23/259; 23/230 B; 366/142

[58] Field of Search ................ 195/127, 139, 103.5 R, 195/103.5 K, 142, 144; 259/48, 54; 220/367; 23/259 R, 230 B; 206/219, 221

[56] References Cited

U.S. PATENT DOCUMENTS 3,083,145 3/1963 Ryan ............................ 195/103.5 K

*Primary Examiner*—Raymond N. Jones
*Assistant Examiner*—Robert J. Warden
*Attorney, Agent, or Firm*—Joseph Martin Weigman

[57] ABSTRACT

A biological testing device comprising a container and plug is disclosed. The container in combination with the plug makes it possible to test a bacterial suspension with a number of different reagents simultaneously. The container which is open at one end has a plurality of microtubes arranged around its lower inside periphery. The plug which fits within the opening of the container distributes the bacterial suspension in substantially equal amounts to each of the microtubes having different testing reagents.

20 Claims, 11 Drawing Figures

Fig.1.
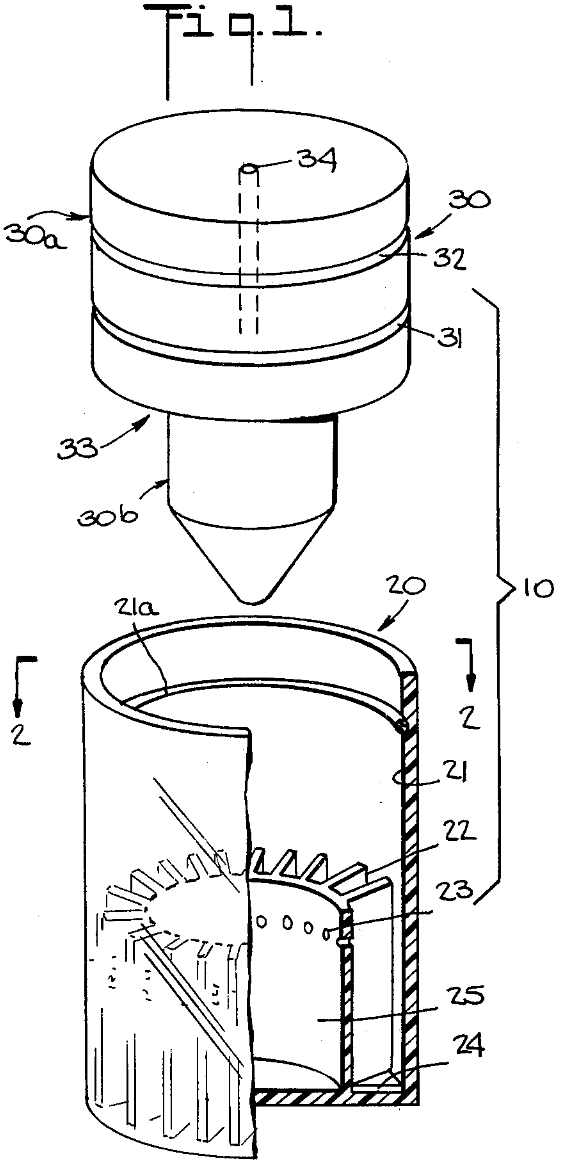
Fig.2.
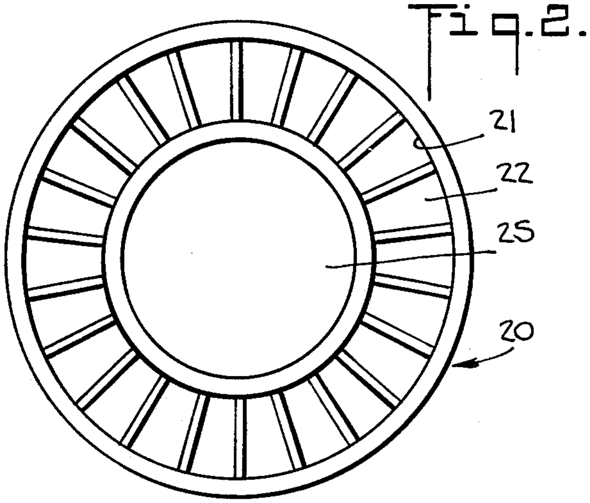
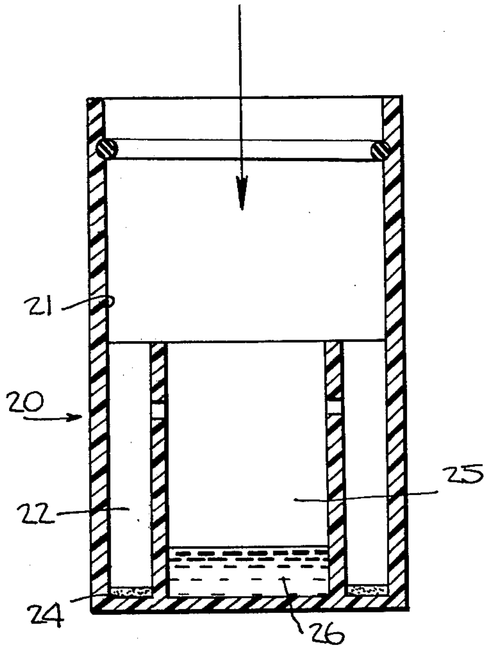
Fig.3.
Fig.4.
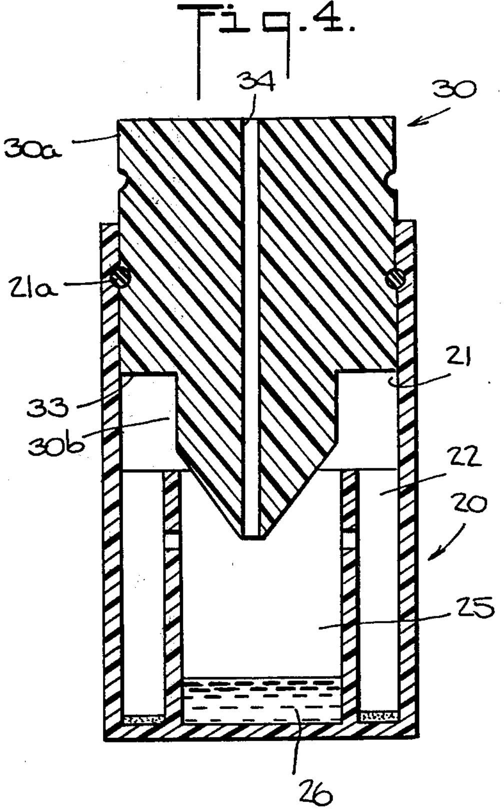

APPARATUS AND METHOD FOR CONDUCTING A PLURALITY OF BIOLOGICAL TESTS

BACKGROUND OF THE INVENTION

1. Field of the Invention

This invention relates to the field of biological testing a bacterial suspension against a variety of reagents simultaneously. More particularly the invention relates to the field of test apparatus which contains a plurality of chambers for conducting different tests upon a common test specimen.

2. Description of the Prior Art

In the past a variety of different methods has been employed for the identification of organisms in families of bacteria such as Neisseria and Enterobacteriaceae. Many of these methods have relied upon the different patterns of development of cultures in the presence of a variety of fermentation media. One of the most common species of Neisseria is *N. gonorrhoeae.*

Until recent years the identification of *N. gonorrheae* although accurate required a 12 to 16 hour incubation period. It is now possible, however, through the use of a rapid fermentation process described by D. S. Kellogg and E. M. Turner, in an article entitled "Rapid Fermentation Confirmation of *Neisseria gonorrhoeae*" published in Applied Microbiology, April 1973, p. 550–552, to decrease the incubation time to about four hours. This method as in the past utilizes the different growth patterns of the organisms in the variety of fermentation media but is able to speed up the fermentation process through the use of a light buffered salt solution. The basic method of patterned growth identification, however, is relatively the same. For example, *N. gonorrhoeae* will ferment glucose while being completely unreactive to maltose, fructose, sucrose, lactose and mannitol. Table 1 which is taken from the Kellogg-Turner article is a complete list of the species within the Neisseria genus, which includes *N. gonorrhoeae,* showing their individual patterns against the six most common fermentation media used in their identification.

TABLE 1:

| Organism | Typical Growth Fermentation Reactions of Neisseria Species | | | | | |
|---|---|---|---|---|---|---|
| | Glucose | Maltose | Fructose | Sucrose | Lactose | Mannitol |
| *N. gonorrhoeae* | + | – | – | – | – | – |
| *N. meningitidis* | + | + | – | – | – | – |
| *N. lactamicus* | + | + | – | – | + | – |
| *N. subflava* | + | + | – | – | – | – |
| *N. flava* | + | + | + | – | – | – |
| *N. perflava* | + | + | + | + | – | – |
| *N. sicca* | + | + | + | + | – | – |
| *N. flavescens* | – | – | – | – | – | – |
| *N. catarrhalis* | – | – | – | – | – | – |

W. J. Brown in his paper published in Applied Microbiology, June 1974, p. 1027–1030, developed an improved method of rapid fermentation of *Neisseria gonorrhoeae* based on the Kellogg-Turner method mentioned above. Brown by varying the volumes of buffer-salt solutions used by Kellogg and Turner in their testing procedure was able to reduce the time necessary to obtain positive results from approximately four to two hours.

Enterobacteriaceae is a class of bacteria found in animals wherein many of the species within a genus can be identified by its growth pattern in a variety of fermentation media. Table 2 lists the typical biochemical reactions of enterobacteriaceae against the ten most common fermentation media used in their identification.

| | Acetion (VP) 1 | Nitrate 2 | Mannitol 3 | Dulcitol 4 | Inositol 5 | Sorbitol 6 | Rhamnose 7 | Sucrose 8 | Raffinose 9 | Malonate 10 |
|---|---|---|---|---|---|---|---|---|---|---|
| *E. coli* | – | + | + | d | – | ± | + | d | d | – |
| *Shigella* | – | + | d | d | – | d | d | – | d | – |
| *Citrobacter* | – | + | + | d | – | + | + | ± | d | d |
| *Arizona* | – | + | + | – | – | + | + | – | – | + |
| *Salmonella* | – | + | + | d | d | + | + | – | – | – |
| *K. pneumoniae* | + | + | + | ∓ | + | + | + | + | + | + |
| *E. aerogenes* | + | + | + | – | ± | + | + | + | + | ± |
| *E. cloacae* | + | + | + | ∓ | ± | + | + | + | + | ± |
| *E. hafniae* | d | + | + | – | – | – | + | – | – | ± |
| *E. Liquefaciens* | + | + | + | – | + | + | – | + | + | – |
| *Serratia* | + | + | + | – | + | + | – | + | – | – |
| *Proteus vulgaris* | – | + | – | – | – | – | d | + | – | – |
| *P. mirabilis* | d | + | – | – | – | – | – | + | – | – |
| *P. morganni* | – | + | – | – | – | – | – | d | – | – |
| *P. rettgeri* | – | + | + | – | + | – | d | d | – | – |
| *Providencia alcalifaciens* | – | + | d | – | – | – | – | d | – | – |
| *Providencia stuartii* | – | + | d | – | + | d | – | d | – | – |
| *Edwardsiella* | – | + | – | – | – | – | – | – | – | – |

+ test result generally positive
± test result more often positive
– test result generally negative
∓ test result more often negative
d different biochemical types Although the above-mentioned methods have resolved most of the objections as to time of incubation and accuracy of results they still require a human operator to first prepare the fermentation media and place them in a series of test tubes or containers and then individually inoculate these tubes with the bacterial suspension to be tested. This preparation process is not only time consuming, but also has the disadvantage of exposing the operator to the bacterial suspension while inoculating the tubes. In some cases such as in testing of Enterobacteriaceae there can be as many twenty tubes to be prepared and inoculated. Thus itcan be seen that the amount of handling and time required to complete the inoculation can become quite substantial. Another difficulty is that the tubes or containers must be suitable to be subjected to a water bath for accelerating the rate of reaction.

U.S. Pat. No. 3,832,532 which issued on Aug. 27, 1974, in addition to disclosing a photometric apparatus and an incubator shaker device, discloses a compartmented container for testing an inoculated broth against a variety of antibiotics. This device consists of a plurality of linear arranged curvettes attached and in communication with an end reservoir. Initially the end reservoir is filled with the broth to be tested and then, through a three step physical manipulation of the entire apparatus, the inoculated broth is delivered to the plurality of curvettes and thus contacts the individual antibiotics discs located at the bottom of the curvettes.

U.S. Pat. No. 3,876,377 which issued on Apr. 8, 1975 discloses a plurality of transparent micro-receptacles mounted on a thin support each of which is provided with a dosed quantity of determined coloured reagents. The product to be analysed is introduced into each receptacle in liquid form and the reaction or non-reaction is observed.

Unlike the present invention inoculation of the above-mentioned micro-receptacles must be done individually. Also these micro-receptacles cannot be sealed once the product to be analysed is introduced; thus heating in a water bath to speed up the fermentation process would be difficult.

SUMMARY OF INVENTION

This invention is directed to a biological testing device which consists of a hollow base container and associated plug. The plug is designed to fit snugly within the base container. The base container is provided at its closed end with a plurality of microtubes arranged around the inside periphery of the container, thereby forming a central chamber in the lower portion of the base container. These microtubes are open at the top and are vented to the central chamber. The closed end of each microtube is provided with a dehydrated chemical reagent material for testing a bacterial suspension. Prior to the use of the device, the plug is removed from the container, thus exposing the central chamber and surrounding microtubes located at the bottom of the container. The bacterial suspension to be tested is then disposed in the central chamber. Thereafter the plug is partially inserted into the container and the total device is inverted. While the device remains in its inverted position the plug is urged forward inwardly with respect to the container until it is fully inserted into the container. At this time the entire device is reinverted, thereby distributing substantially equal amounts of bacterial suspension to each of the microtubes.

Accordingly an object of the present invention is to provide a biological testing device which is portable, disposable and convenient to use.

Another object of this invention is to provide a testing device which will be ready to use and which will reduce the time required in carrying out a plurality of tests upon a single bacterial suspension.

A further object of the invention is to provide a testing device which is adapted to be heated in a warm water bath to speed up the testing of the bacterial against a number of reagents.

Still another object of the invention is to provide a testing apparatus which is adapted to divide a bacterial suspension simultaneously into substantially equal aliquots to be tested against a variety of reagents.

BRIEF DESCRIPTION OF THE DRAWINGS

For a fuller understanding of the invention reference is had to the following description taken in connection with the accompanying drawings of the preferred embodiment in which:

FIG. 1 is a perspective view of the biological testing showing the plug removed from the container;

FIG. 2 is a plan view of the testing device;

FIG. 3 is a vertical section view of the container with the plug removed and showing a bacterial suspension disposed in its lower central chamber;

FIG. 4 is a vertical section view of the container with the plug inserted to its initial position;

FIG. 9 is a perspective view of the apparatus showing indicia on the outer surface thereof;

DESCRIPTION OF THE PREFERRED EMBODIMENTS

Figure 5:
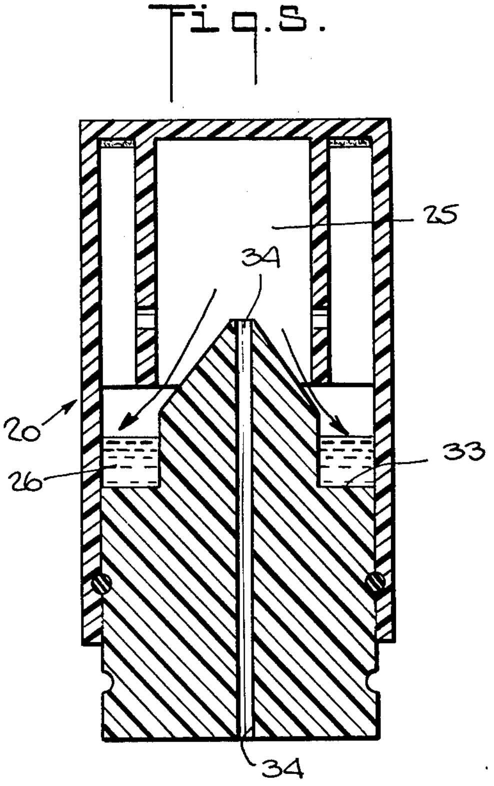
FIG. 5 is a vertical section of the container inverted while the plug is inserted to its initial position and the bacterial suspension is resting on the shoulder of the plug.

As shown in the drawings the biological testing device of the present invention comprises essentially two parts intended to work in conjunction with each other to distribute a substantially equal amount of bacterial suspension simultaneously to a number of different reagents.

Referring now more particularly to the accompanying drawings wherein like numerals designate similar parts throughout the various views, attention is directed first to FIG. 1, wherein the biological testing apparatus 10 of the present invention comprises a hollow base container 20 hereinafter referred to as a container and a plug 30. By way of example, the container and plug can each have an outside diameter less than one inch. Arranged around the inside wall of the lower portion of the container and extending vertically approximately half-way up the inner wall 21 is a plurality of microtubes 22. These microtubes are open at the top and are provided with venting apertures 23. These microtubes as shown in FIG. 3 are also provided at the bottom with different dehydrated reagents 24 for testing a bacterial suspension 26. As shown in FIG. 2 the arrangement of the microtubes 22 around the inside wall 21 of the container, provides for the formation of a central chamber 25 at the lower half of the container 20. This central chamber is adapted to hold the bacterial suspension to be tested. These microtubes can comprise a plurality of separate tubes, or may be integrally formed or molded as part of the base container.

Referring again to FIG. 1, the upper portion of the container is provided with a ridge 21*a* which can be molded or formed to the inside wall 21 of the container 20. The ridge is adapted to engage and seat within the grooves 31 or groove 32 located on plug 30 when the plug is inserted into the container. The ridge and grooves make it possible to lock the plug in an initial position when ridge 21*a* is seated in groove 31 and a final position when ridge 21*a* is seated in groove 32. Alternately the grooves 31 and 32 may be located on the inside wall 21 of the container 20 and the ridge 21*a* may be located on the plug 30.

As can be seen from FIG. 1, plug 30 is composed of an upper cap portion 30*a* and a lower neck portion 30*b*. The neck portion is adapted to fit slidingly and removably into the central chamber 25 located within the lower portion of the container 20. The upper portion of the plug 30 is adapted to fit slidingly and removably into the upper portion of the container 20. Since the cap and neck portion of the plug are of different sizes, a shoulder 33 is provided where the cap portion of the plug joins the neck portion of the plug. The shoulder 33 contacts and seals the opening of the microtubes 22 when the plug is fully inserted into the container. It should be noted that the plug 30 and container 20 are designed such that when the plug is inserted into the containers, the upper portions 30*a* of the plug forms a substantially air tight seal with the upper portion of the container 20, thus preventing the passage of liquid and air to the exterior of the apparatus.

Furthermore when the plug is fully inserted into the container, the outside surface of the lower portion 30*b* of the plug contacts the inside surface of the central chamber 25 located in the lower portion of the container, it also forms a substantially air tight seal between the central chamber and the rest of the container, the plug prevents the passage of liquid from the upper portion of the container to the central chamber.

Plug 30, when inserted into the container, forms a substantially air-tight seal with the container, thereby preventing escape of air from the interior of the device which results in the formation of an internal pressure within the central chamber and surrounding microtubes. This can cause resistance to the insertion of the plug fully into the container. Such resistance due to pressure can be reduced by a system of venting apertures and passages which connect the interior of the container and microtubes to the outside atmosphere in the following manner. Referring to FIG. 1, each microtube 22 is provided at its open end with a venting aperture 23 which vents the interior of the tubes to the central chamber. The central chamber 25 is in turn vented to the exterior of the apparatus by means of a passageway 34 extending vertically through the plug. This passage is of a size to prevent the passage of solution to the exterior of the device and yet allow the escape of air from the internal chambers of the container so that full insertion of the plug into the container is possible. By way of example, passageway 34 may comprise a fine bore hole such as that produced by a #80 drill. Although the passageway 34 greatly reduces the pressure within the central chamber and surrounding microtubes, thereby allowing the plug 30 to be easily inserted, it should be understood that this passageway is optional and that the apparatus will function properly without it.

Prior to the use of this device, plug 30 is removed from the container 20, thereby exposing the interior of the central chamber 25 located at the bottom of the container as shown in FIG. 2. The bacterial suspension 26 to be tested, in liquid form, is then disposed in the bottom of the central chamber 25.

Immediately thereafter the plug is partially inserted into the container until the initial seating groove 31 located on the plug 30 engages the retaining ridge 21*a* positioned on the inside wall 21 of the upper portion of the container as shown in FIG. 4, thereby locking the plug in its initial position. In this initial position, the upper portion of the container 20 is sealed by the upper portion 30*a* of the plug 30; however, the lower or neck portion 30*b* of the plug 30 has not yet contacted the inner walls of the central chamber 25 nor has the shoulder of the plug contacted and sealed the opening of the microtubes 22. As can be seen from FIG. 4, when the plug is in its initial position the central chamber 25 has not yet been sealed to the space which exists between the shoulder 33 of the plug and the top of the microtubes.

The entire testing device is then fully inverted as shown in FIG. 5 while the plug is still in its initial position relative to the container. This causes the bacterial suspension 24 to travel down along the cone-shaped tip of the neck portion of the plug as shown by arrows in FIG. 5 and come to rest on the shoulder 33 of the plug. The cone-shaped tip of the neck portion of the plug depicted in the preferred embodiment serves a two-fold purpose. One is to insure that no liquid is trapped in the central chamber 25 when the plug is fully inserted into the container as would be possible if the end of plug 30 were flat. Secondly the cone-shaped tip helps divert the suspension 26 away from the venting passage 34, leaving it unobstructed to vent the interior of the container of air. As mentioned above, upon inversion of the device bacterial suspension 26, has come to rest on shoulder 33. Since the suspension is in liquid form it will seek its own level and distribute itself evenly around the plug. This even distribution will play an important part in determining the subsequent division of the suspension into equal aliquots to be delivered to the microtubes.

Figure 6:
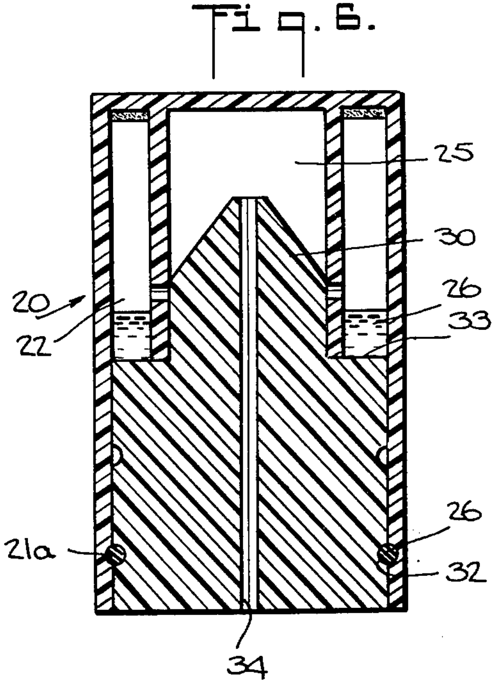
FIG. 6 is a cross-sectional view of the apparatus showing the plug fully inserted to its final position and the shoulder of the plug contacting the openings of the microtubes.
Figure 7:
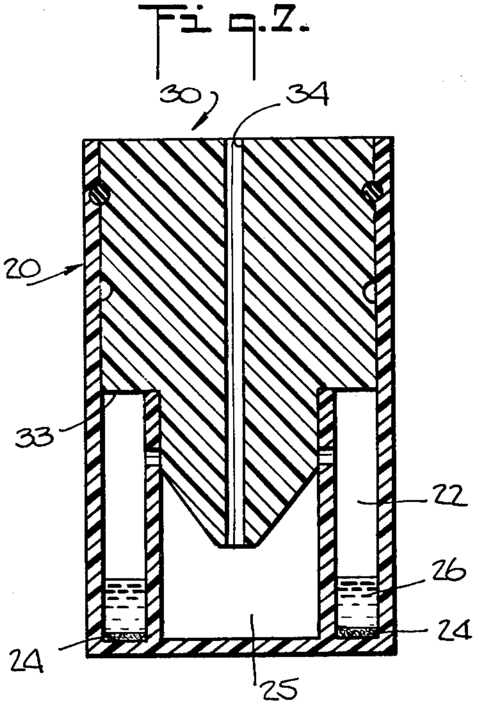
FIG. 7 is a cross-sectional view of the apparatus rightside up showing the plug inserted to its final position and the suspension to be tested contacting the reagent media at the bottom of the microtubes.

While the device is still in the inverted position the plug is urged further into its final position, so that, as shown in FIG. 6 the final seating groove 32 engages the retaining ridge 21*a* on the inside wall of the upper portion of the container. In this position, the neck portion 30*b* of the plug 30 comes into communication with the inside wall of the central chamber 25, sealing it with respect to the bacterial suspension 25 which is still resting on shoulder 33 of the plug. At the same time the top openings of the microtubes 22 are brought into communication with shoulder 33 of the plug, whereupon the suspension 26 which has been resting on the shoulder is divided into equal aliquots by the upper open portion of the microtubes 22. The entire assembly is then reinverted as shown in FIG. 7. The liquid suspension 26 which has been evenly divided by the upper open ends of the microtubes 22 now descends into the tubes 22 and comes into contact with dehydrated reagents 24 located at the closed end of the microtubes 22. Thereafter the bacterial suspension may or may not react with the individual reagents and thereby perform the required test procedure. During construction of the apparatus the inner surface of the closed end portions of the microtubes are textured or roughened to facilitate the adhesion of the chemical test reagent to the closed end portion of the microtubes.

If it is desired to speed up the test reaction, the entire apparatus may be placed in a warm water bath. As shown in FIG. 9 the apparatus is designed such that, in the closed condition, the microtubes are sealed both from each other and from the exterior, thus the operator does not have to be concerned about keeping the apparatus in an upright position.

Although the container and plug of the present invention may be constructed of a variety of different materials, one should keep in mind when selecting the material to be used the type of bacterial suspension and the reagents which are to be used in conjunction with the apparatus, since any reaction between the container and its contents must be avoided.

The use of transparent plastic resin such as polystyrene is convenient for the construction of the container since it is not only chemically inert to the bacteria and reagents but also has the added advantages of being transparent and easily molded. The transparency enables the operator to clearly view at a glance the reaction or non-reaction taking place within the microtubes. If the container is constructed of a non-transparent material, it should be provided with viewing windows or a transparent strip which would run around the circumference of the container, making observation of the interior of the microtubes possible. The plug can be constructed from a variety of different resilient-type materials such as polystyrene which would improve the sealing capabilities of the plug with the container.

As mentioned in the foregoing disclosure when the plug is inserted into the container it forms a number of substantially air tight seals. The quality of these seals may be increased, if desired, by a number of rubber sealing rigs, which can be located on the outer circumference of the plug. The first is located on the cap portion of the plug to increase the quality of the seals between the plug and the upper portion of the container. The second is located on the neck portion of the plug to increase the seal between the neck portion of the plug and the central chamber of the container, when the plug is in its final position. The third is located on the shoulder 33 of the plug, to increase the quality of the seal between the upper open portion of the microtubes and the remainder of the container, when the plug is in its final position.

Figure 8:
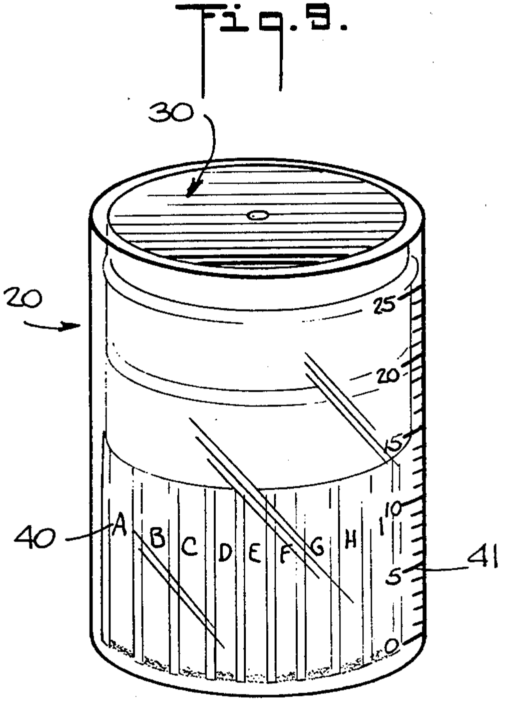
FIG. 8 is a vertical section view of an embodiment of the apparatus in which the plug is provided with a skirt portion to contain the suspension being tested.
Figure 8:
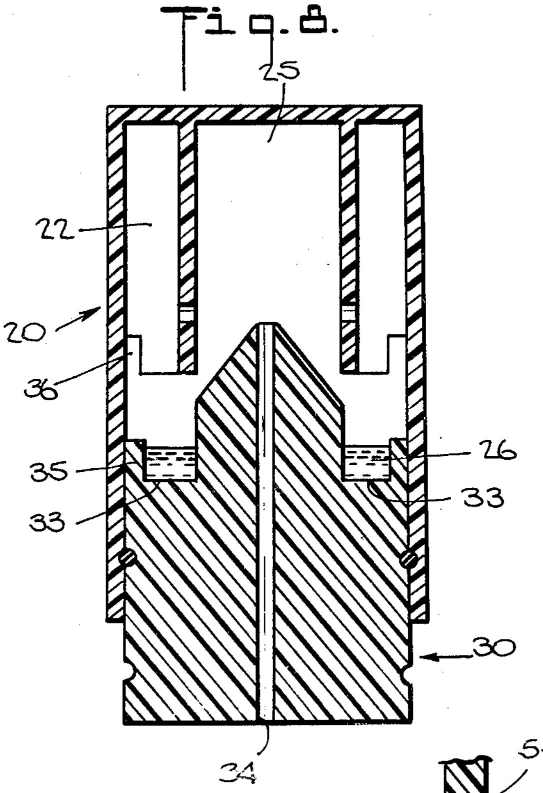

Another embodiment of the present invention is shown in FIG. 8, wherein the plug 30 is provided with a skirt portion 35 on the outer circumference of the shoulder 33. This skirt portion forms a trough around the shoulder portion of the plug such that when the apparatus is inverted the bacterial suspension 26 will rest within the trough, thereby preventing any leakage of the suspension between the cap portion of the plug and the inner wall of the upper portion of the container 20, from occurring. This leakage will not normally occur unless the apparatus is left in the inverted position for a substained period of time.

FIG. 8 also shows the open end portion of the microtubes 22 being provided with relieved portion 36, at a point where the microtubes meet the inside wall of the container 20. This relieved portion accepts the penetration of the skirt portion 35, thereby permitting the open end portion of the microtube to come into direct communication with the shoulder 33.

In FIG. 9, there is shown the application of numbers or symbols 40 to the outside of the container. These numbers or symbols designate the different microtubes and facilitate the identification of the different test reagents as well as the test results. The base container may also be provided with a gradient scale 41 such that the operator of the device can easily determine the volume of suspension introduced into the central chamber or the amount of suspension contained in each of the microtubes.

Figure 11:
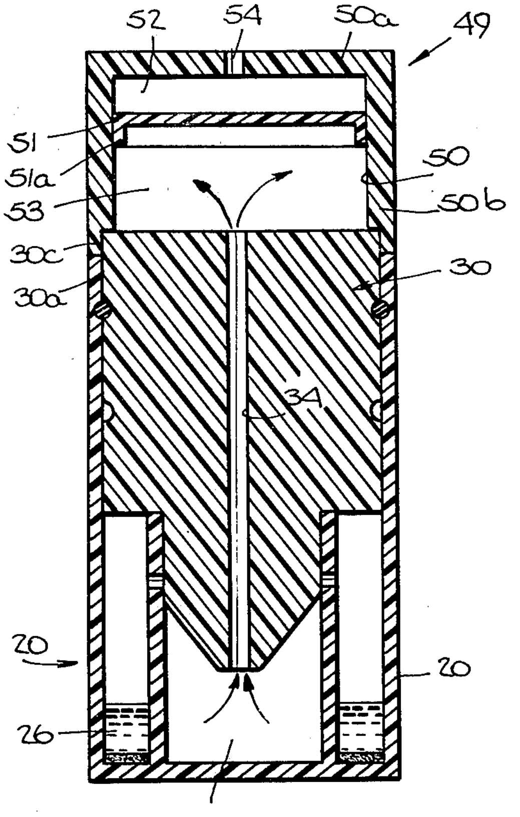
FIG. 11 is a vertical section view of the compression compensator mounted in its operative position.
Figure 10:
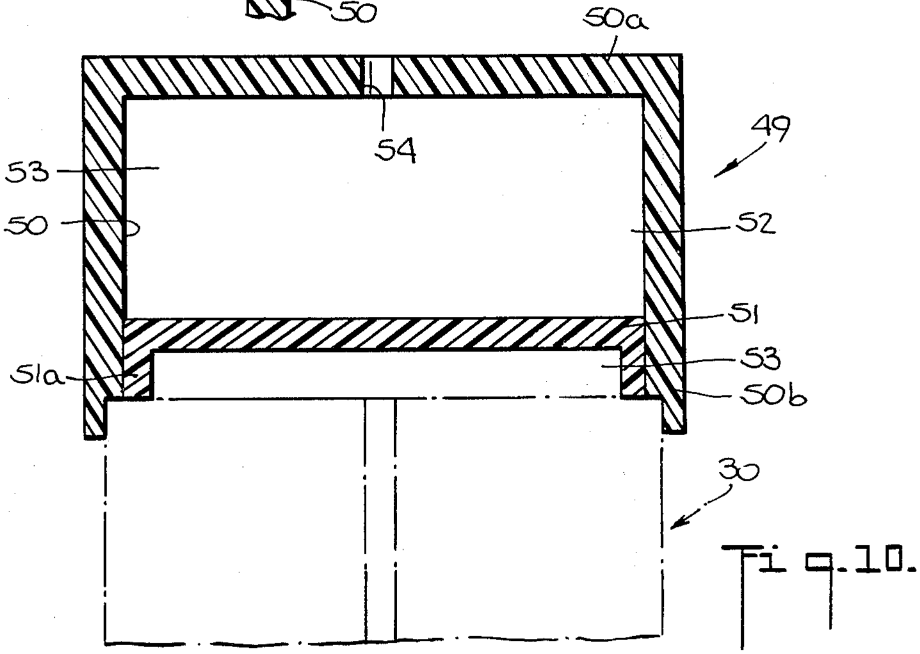
FIG. 10 is a fragmentary vertical section view showing the container provided with a compression compensator with the separation disc thereof in its initial position.

Still another embodiment of the present invention is shown in FIGS. 10 and 11 wherein the upper cap portion 30*a* of the plug is provided with extension 30*c*. The extension 30*c* protrudes above the outer walls of the container 20 when the plug is in its final position. This extension provides a means of attachment for a compression compensator 49.

In many instances where the operator is testing a bacterial suspension containing bacteria which are not communicable, the apparatus can be used without compensator 49 and the air from within the apparatus can be vented directly to the atmosphere. Where the testing involves a bacterial suspension containing bacteria which are contagious, it is preferred that any air vented from the venting passage 34 of the plug 30 to be safely contained within a closed chamber. This provision is advisible since the air vented from passage 34 has been in previous contact with the bacterial suspension 26. As a result of such contact it is possible that a bacterial aerosol could be released from vent 34 as the plug 30 is urged into its final position, as shown in FIG. 7.

In order to eliminate the possible release of a bacterial aerosol, the apparatus of the invention can be adapted with the compression compensator assembly 49 shown in FIGS. 10 and 11. The compression compensator 49 comprises a cylindrical hollow chamber 50 closed at its upper end portion 50*a* and open at its lower end portion 50*b*. The lower end portion 50*b* is adapted to fit by friction or interference in air-tight communication with the cap portion 30*c* of plug 30. As shown in FIG. 11 the cap portion 30*c* of the plug extends beyond the upper rim of container 20 to facilitate the fitting of the compression assembly 49 to it.

Slidingly mounted within the interior portion of chamber 50 is separation disc 51 having flange 51*a* disposed about the periphery of the lower portion of the disc. The disc divides the chamber 50 into an upper and lower region, 52 and 53 respectively, such that the volume thereof relative to each other is dependent upon the position of disc 51 within the chamber. The upper region 52 is provided with a venting aperture 54 which vents the air from the upper region to the atmosphere.

Prior to the use of the compression compensator 49 in conjunction with the biological testing device 10, the separation disc 51, is brought to its lowest position within the compensator as shown in FIG. 10. The entire compensator is then mounted on the top of plug 30 by means of a simple press fit with the outer cap portion of plug 30. In this position flange 51*a* bottoms on the top surface of plug 30. When the separation disc 51 is in its initial or lowest position, region 53 is of smaller volume than region 52. Moreover, region 53 is completely sealed from the upper region 52 as well as the surrounding atmosphere while the upper region 52 is free to vent to the atmosphere through aperture 54.

When the plug 30 is inserted into container 20, subsequent to the introducing of the inoculated bacterial suspension into the container 20, the air within the container 20 which has come into contact with the bacterial suspension is vented through the plug by means of vent 34. This "possibly contaminated" air is in this way introduced into region 53 the lower portion of the compression compensator 60. The introduction of the contaminated air will cause an increase in pressure within region 53 which results in disc 51 moving upwardly, (FIG. 11) thereby increasing the volume of the lower region 53. In this way it is possible for the contaminated air to be fully contained within the said lower region. As the volume of the lower region 53 is increased, the volume of the upper region 52 is proportionately decreased and the air from the upper region 52 which has not been contaminated is vented directly to the atmosphere through venting aperture 54. It can be seen that none of the contaminated air from within the container 20 can escape to the outside atmosphere, but rather is completely contained within the compression compensator 49.

The compression compensator may be constructed of a variety of difficult material. The use of a plastic resin such as polystyrene is convenient not only because it is inexpensive and easily molded, but also since it can be obtained in a transparent form. This transparency enables the user to view the movement of the separation disc 51 during use of the device, thereby providing a visual check that the air vented from chamber 25 is being contained.

As with the biological testing apparatus itself, it is necessary that the compression compensator form a number of substantially air tight seals. The quality of these seals may be increased, if desired, by the application of a number of inexpensive sealing rings. For example, as to the seal formed between the lower open end of the compensator 49 and the plug 30, a rubber gasket or washer may be located on the upper periphery of the cap portion 30c of the plug, thereby increasing the quality of the seal between the plug and the compensator. Also the seal formed between the separation disc 51 and the inner walls of chamber 53 may be improved by fitting a rubber O-ring around the outer circumference of the disc 51. Thus the O-ring will be in constant frictional engagement with both the separation disc and the inner wall of the compensator. It should be noted, however, that this seal should not be so tight as to prevent the free movement of the disc 51 within the compensator 53.

Figure 12:
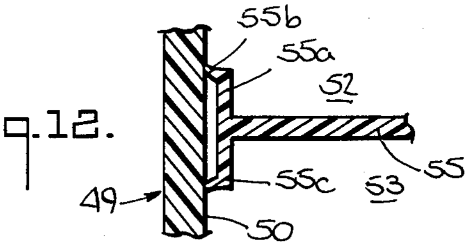
FIG. 12 is a fragmentary vertical section view of a seal construction for the separation disc of the compression compensator.

An alternate construction for increasing the quality of seal between the separation disc 55 and the inner wall 50 of the compensator 49 is shown in FIG. 12. The separation disc 55 formed of flexible material such as resin material is provided with an outer cylindrical rim or flange 55*a*. This outer rim 55*a* is provided with upper and lower annular lips 55*b* and 5*c*, respectively, which contact the inner wall of the compensator. These lips form substantially two independent seals. As a result any contaminated air which, after having been introduced into the lower region 53 manages to leak past the first seal formed between the lower lip 55*c* and the inner wall of the compensator, will be blocked by the second seal formed between the upper lip 55*b* and the inner wall of the compensator. In this way leakage is prevented from entering the upper region 52 and ultimately being vented to the atmosphere.

What is claimed is:

1. A biological testing device comprising:

a tubular container having an opening in its upper portion extending across the longitudinal axis of the tubular container, the lower portion of the tubular container being closed, structure forming a plurality of tubes disposed adjacent the inside periphery of the lower portion of the container, each tube having its length extending substantially parallel to the longitudinal axis of the container and having an open end portion facing the opening in the upper portion of the container and a closed end portion disposed opposite thereto, the tubes and the closed end portion of the container forming a central open chamber therewithin facing and substantially in alignment with the opening in the container, the chamber holding a biological test suspension; and a predetermined chemical reagent material disposed at the closed end portion of each of said tubes; and a plug for closing the upper portion of the container, the plug a cap portion and a neck portion narrower than the cap portion and adjacent thereto, the cap and neck portions forming a shoulder therebetween, the cap portion of the plug fitting slidingly and removably within the upper portion of the container to substantially seal the container, the plug having an initial position with respect to the container in which the cap portion of the plug is engaged with the upper portion of the container and the shoulder portion of the plug is spaced from the open end of each of the plurality of tubes, the plug in the initial position thereof enabling the test suspension to pass from the central open chamber to the shoulder of the plug when the testing device is inverted, the neck portion of the plug fitting slidingly and removably within the central open chamber and substantially sealing said chamber when the plug is fully inserted into the container, the plug having a final position with respect to the container in which the cap portion of the plug is further within the upper portion of the chamber, the neck portion of the plug engages and substantially seals the open central chamber and the shoulder portion of the plug is adjacent the open end of each of the plurality of tubes and substantially divides the test specimen in an approximately equal amount with respect to each of the tubes, the divided test specimen being confined within the individual tubes as the testing device is reinverted.

2. The device of claim 1 wherein the portion of each tube of the plurality of tubes adjacent the open end portion thereof and facing the central chamber has an aperture for venting the tube to the central chamber.

3. The device of claim 1 wherein said plug is provided with a passage extending through the length of the plug from the cap portion to the neck portion thereof, the passage venting the interior of the central chamber of the container when the plug is inserted into the container, the size of the passage being sufficient to pass air for venting but to oppose the movement of liquid therethrough.

4. The device of claim 1 wherein at least one of the container and plug are provided with means for retaining the plug at each of its initial and final positions relative to the container.

5. The device of claim 4 in which the means for retaining the plug at each of its initial and final positions comprises:

a cap portion of the plug having first and second seating grooves in the surface thereof fitting within the upper portion of the container, the grooves being spaced apart from one another at a distance corresponding to the length of travel of the plug from its initial to its final position;

the upper portion of the container having a retaining ridge positioned on the inner surface thereof to engage one of grooves when the plug is in one of the initial and final positions to retain the plug therein.

6. The device of claim 1 wherein the container and plug are substantially cylindrical in shape.

7. The device of claim 1 wherein the end of the neck portion opposite the shoulder portion of te plug is tapered.

8. The device of claim 1 wherein the container is formed of a transparent resin material.

9. The apparatus of claim 1 wherein the plug is constructed of a resilient material.

10. The apparatus of claim 1 wherein the container is provided with a means for identifying each of the plurality of tubes.

11. The apparatus of claim 1 wherein inner surface of the closed end portion of each tube of said plurality of tubes is provided with a textured surface so as to affect good adhesion of the predetermined chemical reagent to said inner surface.

12. The device of claim 1 wherein the shoulder of the plug is adjacent and substantially closes the open end of each of the plurality of tubes, when the plug is moved to its final position with respect to the container.

13. A biological testing device comprising:

a transparent cylindrical container having an opening in its upper portion extending across the longitudinal axis of the container, the lower portion of the container being closed, structure forming a plurality of tubes disposed adjacent the inside periphery of the lower portion of the container, each tube having its length extending substantially parallel to the longitudinal axis of the container and having an open end portion facing the opening in the upper portion of the container and a closed end portion disposed opposite thereto, the tubes and the closed end portion of the container forming a central open chamber therewith facing and substantially in alignment with the opening in the container, the chamber holding a biological test suspension, a portion of each tube of the plurality of tubes adjacent the open end portion thereof and facing the central chamber has an aperture for venting the tube to the central chamber, said tubes also being provided at the closed end thereof with a predetermined chemical reagent material; and a plug for closing the upper portion of the container, the plug having a cap portion and a neck portion narrower than the cap portion and adjacent thereto, the cap and neck portions forming a shoulder therebetween, the cap portion of the plug fitting slidingly and removably within the upper portion of the container to substantially seal the container, the cap portion of the plug having first and second seating grooves in the surface thereof engaging a retaining ridge positioned in the inner surface of the upper portion of the container for holding the plug at an initial and final position with respect to the container, wherein in the initial position the cap portion of the plug is engaged with the upper portion of the container and the shoulder portion of the plug is spaced from the open end of each of the plurality of tubes, thus enabling the test suspension to pass from the central open chamber to the shoulder of the plug when the testing device is inverted, the neck portion of the plug fitting slidingly and removably within the central open chamber to substantially seal said chamber when the plug is fully inserted to the container, the end of the neck portion of the plug opposite the shoulder portion of the plug being tapered, wherein in the final position the cap portion of the plug is further within the upper portion of the container, the neck portion of the plug is within the central chamber and the shoulder portion of the plug is adjacent the open end of each of the plurality of tubes dividing the test specimen substantially into equal amounts with respect to each of the tubes, the divided test specimen being confined with the individual tubes as the testing device is reinverted, the plug also being provided with a passage extending through the length of the plug from the cap portion to the neck portion thereof, the passage venting the interior of the central chamber of the container when the plug is inserted into the container.

14. The device of claim 13 wherein the passage extending through the length of the plug is of a size sufficient to pass air for venting but to oppose the movement of liquid therethrough.

15. The apparatus of claim 13 wherein the container is constructed of resin material.

16. The apparatus of claim 13 wherein the plug is constructed of resilient material.

17. The apparatus of claim 13 wherein the microtubes are individual tubes arranged in a circular fashion within the central chamber.

18. The apparatus of claim 13 wherein the microtubes are an integral part of the base container and are arranged in a circular fashion within the central chamber.

19. A method for testing a bacterial suspension against a plurality of testing reagents, by employing a tubular container being open at one end portion and having disposed adjacent the inside periphery of the closed end portion, disposed opposite the end portion, a plurality of microtubes each having an opening facing the open end portion of the container, the container having an open central chamber, each of said plurality of microtubes being provided at its closed end opposite the opening thereof with a predetermined chemical reagent, wherein the method comprises the following steps:

a. depositing a sample of bacterial suspension to be tested into the bottom of the central chamber, b. inserting a plug of predetermined configuration to a first position to seal the open-end portion of the tubular container, while leaving open the open ends of the microtubes, said plug having an upper portion slidingly fitting in the upper cap portion of the container in first and second positions and a lower neck portion slidingly fitting in the central chamber in said second position;

c. inverting the entire apparatus such that the bacterial suspension flows to the sealed open end portion below the open end portion of the microtubes;

d. moving said plug to said second position to seal the central chamber from the open end of the microtubes while the device remains in its inverted position; and e. reinverting the device to enable the bacterial suspension to flow in substantially equal amounts to the individual microtubes.

20. A method as set forth in claim 19 and further comprising observing the reaction and the non-reaction of the bacterial suspension with the predetermined chemical reagent located at the closed end portion of each of the microtubes.

* * * * *